3,088,300
TREATING GLASS SHEETS
James H. Elliott, Greensburg, Pa., assignor to Pittsburgh Plate Glass Company, Allegheny County, Pa., a corporation of Pennsylvania
Filed Oct. 21, 1959, Ser. No. 847,821
2 Claims. (Cl. 65—288)

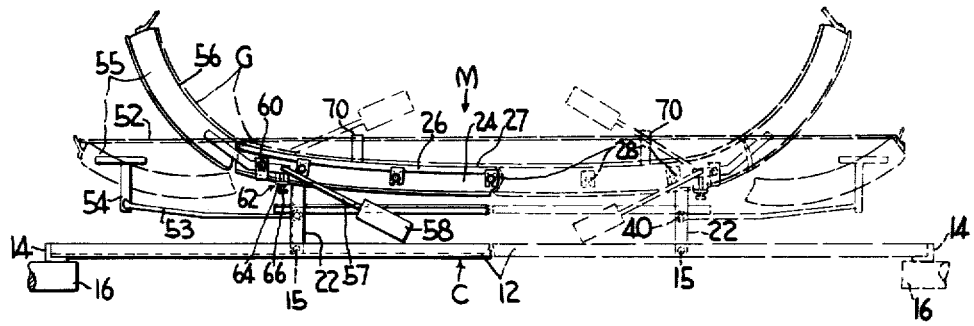
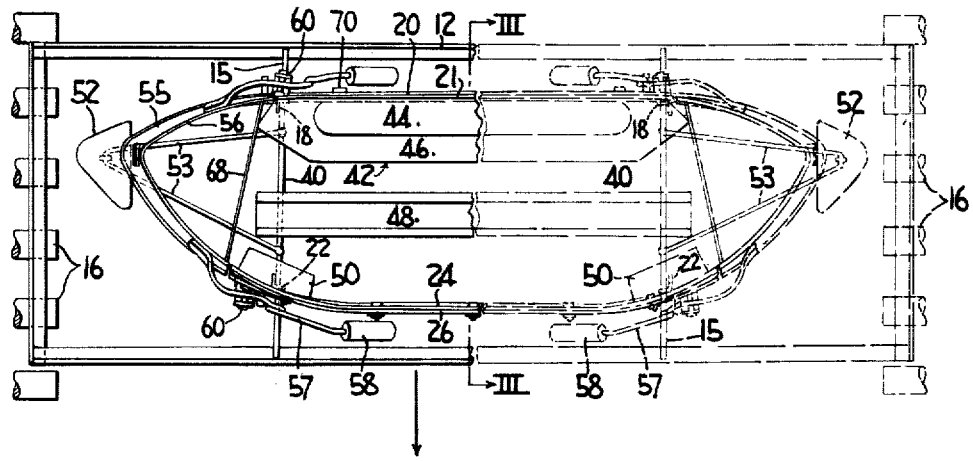
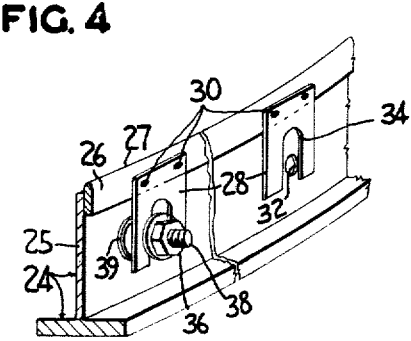
INVENTOR.
JAMES H. ELLIOTT
BY
Oscar L. Spencer
ATTORNEY

United States Patent Office 3,088,300
Patented May 7, 1963

The present invention relates to Treating Glass Sheets, and specifically is concerned with improved apparatus for bending glass sheets in which the stresses along their marginal edges are controlled.

Glass sheets are currently bent for automotive windshield production by mounting the sheets in pairs on sectionalized molds of skeleton outline. The sections of the molds are composed of one or more edgewise disposed rails whose upper edges conform to the shape desired for a portion of the bent glass. The sections move into a spread mold position for receiving a flat glass sheet for bending and tend to move into a closed mold position wherein the upper edges of the rails provide a substantially continuous shaping surface conforming in elevation and outline to the shape desired for the bent glass sheet.

In present commercial windshield production, the glass sheets are mounted in pairs on molds spread for bending. The molds are conveyed transversely through a tunnel-like bending lehr having different temperature zones. The first of these zones is a preheat zone wherein the temperature of the glass is raised to substantially its softening point. Beyond this zone is a bending zone wherein the glass is further heated with intense heat applied locally to the regions to be bent most sharply. The combination of the tendency of the mold sections to move from their spread position to the closed mold position plus the softening effect on the glass of the additional heat supplied in the bending zone causes the glass to conform to the shaping surface of the upper edges of the mold rails.

The bent glass sheets are then annealed by controlled cooling as they are conveyed through an annealing zone having successive regions. The ambient temperature of each successive region traversed by the bent glass sheet is lower than that of its preceding region in the annealing zone. Thus, the rate of cooling the bent glass sheet is controlled by the speed at which the glass sheets traverse the different regions of the annealing zone and the temperature differences between adjacent annealing zone regions.

It is well known that the stress pattern imparted to a glass sheet is a function of the cooling rate imposed on different regions of the glass sheet as it cools through its annealing range. The regions cooled at a relatively rapid rate of cooling through the annealing range become permanently stressed in compression while the regions cooled at a relatively slow rate of cooling through the annealing range become permanently stressed in tension. These regions remain in permanent stress as long as the glass sheet is kept at temperatures below the glass annealing range.

The best technique yet developed for bending glass sheets while mounted on bending molds of skeleton outline and conveyed through a tunnel-type bending lehr involves precutting the glass sheets to their ultimate outline before bending. The skeleton outline of the bending mold supporting the sheet for bending encompasses an area slightly smaller than the outline of the bent sheet. This permits the periphery of the bent glass sheet to cool relatively rapidly through the annealing range. At the same time, the portion of the bent glass sheet slightly within the periphery of the bent sheet cools less rapidly through the annealing range because its rate of cooling is retarded by virtue of the thermal capacity of the mold in contact with the glass. The different rates of cooling of the bent glass sheet peripheral margin and the portion in contact with the mold establish a compression stress in the periphery and a tension stress in the band contacting the mold.

The peripheral margin of the glass sheet extending outside the skeleton outline of the mold cannot exceed ¼ inch. If the margin is substantially wider than this limit, the glass sheet develops a reverse sag along its margin during the bending operation. The reverse sag causes difficulty in mounting the bent sheet within a curved, glazing frame. However, locating the skeleton outline mold so close to the peripheral margin of the bent sheet imposes a tension stress adjacent the peripheral margin of the glass sheet, in fact, within about ¼ inch of its margin. The present invention provides a suitable stress pattern and, at the same time, support for the bent glass sheet within the limits recited above.

Since mass production requires the fastest possible rate of production of windshields, the flat glass industry has attempted to increase its production rates by moving the glass sheets as rapidly as possible through the bending lehrs, thereby increasing the temperature gradients imposed on the sheets during bending and annealing. Specifically, it has been found that the glass sheets tend to develop undesirable tension stresses in a narrow band approximately ¼ to ⅜ inch laterally within the leading side edge that is conveyed through the lehr. These bands of tension stress are weaknesses in the glass that cause the glass to form vents, usually in the form of a hook shape extending from 3 to 4 inches from the edge of the plate.

As explained above, the glass sheet edge is stressed in compression and the interior of the glass stressed in tension. As long as the compression skin surrounds the tension stressed interior or the magnitude of the tension stressed is limited, no harm results. However, once the compression skin is pierced as by a fine surface scratch, the magnitude of the internal tension stress determines whether the surface scratch heals or deteriorates into a serious vent.

It is very difficult to bend glass sheets rapidly on a mass production basis while controlling its maximum internal stress so that the latter is considerably below that causing tension strain of considerably under 100 millimicrons per inch, preferably below 60 millimicrons per inch. It has been determined that if the strains resulting from tension stresses are thus reduced, the bent glass sheets are less vulnerable to breakage from scratches in this area. Instead, surface scratches heal rather than cause vents at these controlled internal stresses.

Previous work in the manufacture of bent glass sheets has determined that the best orientation of the glass sheets for conveyance through a bending lehr involves moving the glass sheets transversely. This technique results in establishing a thermal gradient in the bent glass sheets between the exposed leading side edge and the portion immediately adjacent the leading side edge contacting the mold rail when the bent glass sheets are conveyed through an annealing zone of progressively decreasing temperature. The steepness of the thermal gradient is a function of the rate of change of temperature to which the glass sheets are subjected during annealing.

If the glass sheets are moved rapidly through the annealing zone, these thermal gradients are steep. Such steep thermal gradients result in a high compression stress at the leading side edge and a relatively high tension stress in the interior of the glass immediately within the leading side edge.

An obvious solution for this problem would be to reduce the speed at which the glass sheets move through the bending lehr, thus reducing the thermal gradients which produce the elevated stresses within the glass. However, the insatiable appetites of the automobile manufacturers for bent windshields makes it necessary to maintain a high rate of production. The present invention provides a solution wherein the tension stresses in the region immediately adjacent the leading side edge of the glass sheets are minimized, while permitting a high rate of windshield production.

According to the present invention, the stresses in the region including the leading side edge of the glass sheets and the portion contacting the skeletonized bending mold are maintained at satisfactory levels. This is accomplished by utilizing one or more shaping rails having a relatively small cross section to provide flexibility and relatively small thermal capacity and a stiffening rail having relatively large cross section to provide rigidity disposed in side-by-side relation to the shaping rail within an outline formed by the shaping rails. The stiffening rail is disposed completely below the upper edge surface of the edgewise disposed shaping rail which forms part of the skeleton outline mold shaping surface. The shaping rail is adjustably secured in slidable relation to the stiffening rail for securement to the element attached to the shaping rail.

In a particular embodiment of the present invention, the attachment means for adjustably securing the shaping rail to the stiffening rail comprises a series of slotted metal plates spot welded to the shaping rail and aligned with apertures in the stiffening rail. Nuts and bolts are utilized to attach the slotted plates in an adjustable relationship to the stiffening rails.

An embodiment illustrating the present invention will now be described in order to improve the understanding of the present invention.

In the drawings which form part of the description of the illustrative embodiment, FIG. 1 is a longitudinal elevation of a typical sectionalized mold shown half in phantom and half in full lines. The wing sections of the mold are shown in their closed position in full lines and in their open position in phantom in this figure.

FIG. 2 is a plan view of the mold in its closed mold position shown half in phantom and half in full lines.

FIG. 3 is a sectional view along the lines III—III of FIG. 2 depicting the remainder of the mold in phantom, and showing dashed lines indicating the disposition of the glass sheet both before and after bending.

FIG. 4 is an enlarged perspective view of a portion of a mold, showing a shaping rail reinforced with a stiffening rail according to the present invention.

In the drawings, wherein like reference characters refer to similar structural elements, a mold M is shown supported on an open frame carriage C. The mold, in turn, is supporting one or more glass sheets G.

The open frame carriage C comprises a pair of longitudinally extending side rails 12 interconnected at their extremities by transversely extending L-shaped end rails 14 and intermediate their extremities by intermediate cross rods 15. The end rails 14 provide support for the carriage and the mold for transport along a stub roll conveyor provided by stub rolls 16 through a bending furnace (not shown). A minimum number of intermediate cross rods 15 are included, only enough to insure sufficient rigidity with a minimum of mass.

Angle irons 18 extend upwardly from the carriage frame to form vertical support posts supporting a rail 20 of inverted T section having an upper edge 21 of slightly concave elevation conforming to a portion of the ultimate shaping surface. In fact, surface 21 of rail 20 conforms to the shape desired adjacent the lower longitudinally extending edge of the center portion of a curved windshield after the latter is installed in a vehicle.

Additional angle irons 22 extend vertically upwardly from the intermediate cross rods to provide additional mold support posts for a stainless steel stiffening rail 24 of inverted T-section. A shaping rail 26 having an upper edge 27 conforming to the shape desired for a portion of a glass sheet adjacent the longitudinal side edge opposite that side edge of the glass sheet ultimately supported on the upper edge 21 of center section rail 20 has a relatively small cross section compared to that of stiffening rail 24. Thus, shaping rail 26 is relatively flexible and has a relatively small thermal capacity compared to the relatively large cross section, rigidity and relatively large thermal capacity of stiffening rail 24.

Means are provided for adjustably securing shaping rails 26 to stiffening rail 24. This means comprises a plurality of slotted metal plates 28 sperated by from six to nine inches from each other and spot welded at spot welds 30 to the flexible shaping rail 26. Apertures 32 are provided in stiffening rail 24 in alignment with slots 34 provided in the slotted metal plate 28.

In a typical embodiment of the present invention, the various elements are constructed as follows. The shaping rail 26 comprises a length of stainless steel rail shaped to conform lengthwise to the shape desired for the bent glass sheet and of ½ inch width of 3/16 inch thickness. The upper edge 27 is rounded at its corners and its middle 1/16 inch is maintained flat to provide a 1/16 inch flat surface for supporting an edge of the glass thereon. The stiffening rail 24 is formed of inverted T-cross section comprising a vertically oriented rail member 25, 1/8 to ¼ inch thick, 1½ to 2 inches long and a horizontally oriented rail member having a width of about 1 inch and about ¼ inch thick attached to the bottom edge of the vertical rail member 25. The slotted metal plates 28 are of stainless steel 1/16 inch thick. The slots 34 have a width of 3/8 inch and the apertures 32 are of 5/16 inch diameter. Nuts 36 and bolts 38, the latter preferably ¼ inch outer diameter are utilized together with washers 39 to adjustably secure the shaping rail 26 to the vertical rail member 25 of the stiffening rail 24.

Cross braces 40 interconnect the posts 18 and 22 and also serve to cooperate with rail 20 to support a composite heat absorber 42 comprising metal plates 44 and 46 mounted in echelon. The composite absorber 42 extends lengthwise of the mold and laterally within its line of attachment to the bottom of rail 20. The cross bracing 40 also supports a reflector 48 of thin sheet metal extending lengthwise to underlie the portion of the glass sheet that is to be transversely bent most severely about an axis extending longitudinally of the sheet.

Additional absorbers 50 are located adjacent and laterally within the extremities of stiffening rail 24 to provide assistance to retard the cooling of the glass sheet in this region, thus helping maintain the regions of the glass overlying this region relatively stiff and helping provide a desirable stress pattern in this region. These additional absorbers 50 may extend longitudinally laterally within the stiffening rail 24 completely along its length if necessary to serve as extensions of stiffening rail 26 for its entire length. The rate of movement of the mold through the lehr and the gradient between adjacent regions of the annealing zone of the lehr determine the necessity, the number and the size of any additional absorbers required.

Additional tip absorbers 52 are attached to cross braces 40 by means of rods 53 and posts 54. These tip absorbers prevent curling of the glass sheet tips resulting from overheating in these areas. Tip absorbers 52 are of triangular configuration and fit within the triangular outline of wing section rails 55 of inverted T section. The upper edges 56 of the wing sections 55 provide the end portions of the mold shaping surface and are shaped to conform to the corresponding portions of the bend desired for the glass sheet.

The wing section rails 55 are pivoted relative to the center mold section provided by rails 20 and 26 in the following manner. Crooked lever arms 57, each having a counterweight 58 at its longitudinal inward extremity, are attached to and extend inwardly from the extremities of the wing section rails 55. The lever arms are pivoted about pivot hinges 60 located below and inwardly of the longitudinal extremities of the center section rails 20 and 26.

The crooked lever arms 57 rotate in vertical planes about the pivot hinges 60. These planes intersect the positions occupied by stop members 62 which are fixed in position for contact by the crooked lever arms 57 when the wing sections 55 have rotated into a closed mold position. In the latter position, upper shaping surfaces 56 cooperate with upper shaping surfaces 21 and 27 of the center section rails 20 and 26 to provide a substantially continuous outline conforming to the shape desired for the bent glass sheet.

Each stop member 62 comprises an apertured horizontal plate 64, and an adjustment screw 66 suitably screw-threaded through the aperture of the apertured horizontal plate 64. Suitable lock nuts are provided to lock the stop members 62 in their proper vertical position to control the closing position of the wing sections 55 if necessary. A bar 68 interconnects the free longitudinal inner ends of the wing section rail 55 to enhance the structural rigidity thereof.

The mold also includes a pair of longitudinally spaced posts 70. The latter are located slightly laterally outwardly of rail 20 and are adapted for contact by a longitudinally extending side edge of a glass sheet to insure that the sheet is in proper transverse alignment with the mold. The molds operate as follows:

At the loading end of a tunnel-like bending lehr, the wing sections 55 are pivoted into a lower position wherein their longitudinal outer extremities which provide the longitudinal extremities of the sectionalized mold support one or a pair of flat glass sheets adjacent their longitudinal extremities preparatory to bending. The wing sections 55, the counterweights 58 and the crooked lever arms 57 are so constructed relative to pivot hinges 60 that the center of gravity of these connected members is located longitudinally inside of the pivot hinges 60. Therefore, the counterweights 58 tend to pivot the wing sections 55 from their lowered positions wherein they support a flat glass sheet into a closed position determined by the engagement of the crooked counterweighted arms 57 with the stop members 62.

One or more glass sheets precut to their ultimate outline are then mounted on the mold with one longitudinal side edge abutting the longitudinally spaced alignment posts 70. The mass of the flat rigid glass holds the mold wing sections in their lowered positions. The glass sheet is also supported intermediate its extremities on the longitudinal extremities of the center section mold rails 20 and 26.

The glass laden mold is then conveyed laterally in the direction of the arrow of FIGURE 2 through a bending lehr where the glass is first heated substantially uniformly to its annealing range. Once the glass sheet reaches its annealing range, all stresses that have been previously imposed in the glass are relieved.

It is noted from FIGURE 3 that the elevation of mold rail 26 is higher than that of mold rail 20. This causes the side of the glass sheet supported on the mold shaping rail 26 after bending to be maintained throughout the bending cycle at a slightly higher elevation than the side of the glass overlying the heat absorbing member 42 which is designed to be relatively flat in the final compound shape produced from the bending operation.

After the glass temperature exceeds the annealing range, its heating continues. The heat applied to the glass in this stage is not uniform so that the portions of the glass to be bent severely about the transverse axis intersect spaced regions of intense radiation, whereas the center portion of the glass intersects a region of moderate radiation intermediate the intensely radiated regions and is only sagged slightly.

The longitudinally extending portion of glass overlying reflector 48 reaches a higher temperature than parallel, longitudinally extending portions. Thus, the portion above reflector 48 softens to cause the glass to sag locally about an axis extending parallel to the longitudinal axis of the glass sheet. The presence of the composite heat absorber member 42 retards the heating and, consequently, the softening of the portion of the glass sheet region overlying this member. The presence of the additional heat absorbers 50 helps to maintain the glass substantially flat along the other side edge. The combination of localized absorption areas flanking a heat reflecting region localizes the sharpest region of the sag or transverse bend imposed on the glass sheet about an axis extending longitudinally thereof.

Heat absorbers 52 located adjacent the tips of the mold when the mold is in its spread position retard the heating of the pointed tips of the glass sheet sufficiently to prevent the tips from curling and overbending out of contact with the mold extremities during bending. As the glass sheet reaches its softening point, its bending is accelerated by the mechanical force resulting from the net weight applied to the wing sections 55 by the counterweighted lever arms 57 and counterweights 58. Thus, the extremities of the glass sheet are lifted upwardly and folded inwardly toward each other to form a non-uniform longitudinal bend about the transverse axis of the glass sheet. Substantially simultaneously, the glass is bent transversely about its longitudinal axis by the heat reflected or reradiated from the metallic reflector 48 combined with the heat retarding effect of the various heat absorbers.

The speed of movement of the mold through the bending zone is adjusted so that as soon as the glass sheet conforms to the shaping surface provided by the upper edges 21, 27 and 56 of the various shaping rails forming the ultimate shaping surface of the mold, the glass is removed to the annealing zone. The annealing zone is a continuation of the tunnel-like lehr and extends beyond the preheat and bending zones. In the annealing zone, the glass laden mold traverses successive regions of decreasing temperatures.

The difference of the temperature provided in successive zones and the rate of movement of the glass laden mold through the successive regions of the annealing zone determine the thermal gradients imposed in the bent glass, particularly at its leading edge. The construction of the present invention is believed to moderate the thermal gradients provided at the leading edge of the glass by having the shaping rails 26 of relatively small thermal capacity by virtue of their small cross sectional area and mass. Thus, they do not retard the cooling of the portion laterally adjacent the leading side edge of the glass sheet in contact therewith at the rate achieved by the relatively massive mold rails of the prior art. At the same time, the large cross section and mass of the stiffening rail 24 located inwardly of the shaping rail 26 retards the cooling of the portion further laterally inwardly of the side edge to a lesser extent than a rail of the same mass and cross-section contacting the glass performed in the prior art. This construction, used with the heat absorbers 42 and 50, if necessary to compensate for high lehr speeds, causes the relative rates of cooling the leading side edge and the regions laterally adjacent the leading side edge to differ less severely from each other than formerly.

Accordingly, the relative cooling rates for the peripheral margin of the glass and the portion inward of the peripheral margin are such that smaller temperature gradients between these portions result as the glass sheets are cooled through their annealing range following the bending operation. Thus, the magnitude of tension stresses is reduced and the bent glass sheets are improved in their resistance to spontaneous breakage.

At the same time, the flexibility of the shaping rails 26 makes it possible to adjust their shaping surfaces 27 by a simple adjustment involving relocating the relative vertical position of one or more slotted metal plates 28 relative to stiffening rail 24 and by loosening one or more plates 28, distorting the loosened portion of the shaping rail to the correct shape desired and clamping each plate 28 to rail member 25 with the localized portion of shaping rail 26 in its proper vertical position relative to stiffening rail 24. This procedure is repeated increment by increment until the longitudinal shape of the entire length of flexible shaping rail 26 and, hence, the configuration of its shaping surface 27 conforms to the desired shape whenever a shaping surface gets out of tolerance. In the past, the rigid shaping rails, when out of tolerance as to shape, required expensive machining to bring the shaping surface back into tolerance. The employment of flexible shaping rails adjustably attached to stiffening rails thus provides the rigidity of the prior art rails, ease of adjustment to obtain tolerance and the double benefit of rigidity and stress pattern improvement resulting from the use of massive stiffening rails inside the shaping rails.

Another benefit derived from the present construction is that marring of the glass sheet surface is reduced considerably, because the glass sheet slides over a relatively thin shaping rail rather than the relatively thick edges required of the prior art. Also, the shaping rails of the present construction cool rather rapidly compared to the cooling rate for the relatively massive stiffening rails of the present construction, which correspond to the prior art construction for shaping rails. This relatively rate of cooling of the shaping rail and the stiffening rail is evidenced by the fact that when the mold leaves a tunnel-like bending and annealing lehr, the shaping rail may be touched by hand, whereas the stiffening rail is still too hot to handle. Therefore, the novel shaping rail of the present construction has a cooling rate that follows that of the glass sheet very closely, thus lessening the time that the glass is in direct contact with hot metal compared to that inherent in prior art skeletonized molds. Thus, the readily cooled shaping rails of the present invention tend to mar the glass surface to a lesser degree than the prior art massive shaping rails during the bending cycle.

While the illustrative embodiment shows only the shaping rail for the leading side edge constructed according to the teachings of the present invention, the construction shown in FIG. 4 may be employed for each mold section to encompass the entire perimeter of the mold. The leading side edge of a skeleton mold is usually the portion of the mold periphery most likely to cause high thermal stresses in the glass because air currents in a tunnel-type bending lehr are most likely to accelerate the cooling rate at the leading edge of the glass sheets conveyed through the lehr.

The above description of typical embodiments has been for the purpose of illustration rather than limitation. Reference to the latter, which includes equivalents made obvious in the light of the present disclosure may be determined from the claimed subject matter which follows.

What is claimed is:

1. In a skeleton outlined mold for bending glass sheets having edgewise disposed shaping rails which form an outline shaping surface and contact the glass sheets supported thereon at an outwardly disposed peripheral area slightly within the outermost edge periphery of the glass sheet, the improvement which comprises:

(a) an edgewise disposed, flexible shaping rail having an upper edge surface forming a part of the skeleton outline shaping surface, said shaping rail having an inner wall and an outer wall, said walls extending downwardly from said upper edge surface in closely spaced relation to provide a shaping rail of relatively small cross section thus imparting flexibility and relatively small thermal capacity to said shaping rail;

(b) a stiffening rail having an upper edge and inner and outer walls, said outer wall of said stiffening rail being in contact with and in abutting, side-by-side relation to said inner wall of said shaping rail, said stiffening rail having a relatively large cross section compared to that of said shaping rail to provide rigidity and relatively large thermal capacity, and wherein the upper edge of said stiffening rail lies below the said upper edge surface of said shaping rail, said upper edge of said stiffening rail lying inwardly of said outwardly disposed peripheral area of the glass sheet; and (c) vertically adjustable, releasable securing means for releasably securing said shaping rail to said stiffening rail, said securing means comprising
(1) a first vertically adjustable element attached to and in contact with said shaping rail, the uppermost portion of said first element lying below said upper edge surface of said shaping rail, and
(2) a second element releasably securing said first element to said stiffening rail.

2. In a skeleton mold for bending glass sheets which comprises a main molding section and an auxiliary section pivotally attached to the main molding section for movement between a spread mold position for supporting a glass sheet preparatory to bending and a closed mold position wherein the molding sections cooperate to provide a skeleton outline shaping surface, the improvement which comprises:

(a) a main molding section comprising a pair of laterally spaced, edgewise disposed, flexible shaping rails having upper edge surfaces forming a part of the skeleton outline shaping surface, said flexible shaping rails each having inner and outer walls, said walls extending downwardly from said upper edge surfaces in closely spaced relation to provide shaping rails of relatively small cross section thus imparting flexibility and relatively small thermal capacity to said shaping rails;

(b) a stiffening rail having an inner wall and an outer wall, said outer wall of said stiffening rail being in contact with and in abutting side-by-side relation to the inner wall of at least one of said edgewise disposed shaping rails within said outline shaping surface, and
said stiffening rail having an upper edge located below the upper edge surface of said one edgewise disposed shaping rail,
said stiffening rail having a relatively large cross section compared to that of said shaping rails to provide rigidity and relatively large thermal capacity; and (c) vertically adjustable, releasable securing means for releasably securing said one shaping rail to said stiffening rail, said securing means comprising
(1) a first vertically adjustable element attached to and in contact with said one shaping rail, the uppermost portion of said first element lying below said upper edge surface of said one shaping rail, and
(2) a second element releasably securing said first element to said stiffening rail.

References Cited in the file of this patent

UNITED STATES PATENTS

| 2,297,315 | Owen | Sept. 29, 1942 |
| 2,827,738 | McKelvey | Mar. 25, 1958 |

FOREIGN PATENTS

| 1,089,973 | France | Oct. 13, 1954 |
| 1,174,962 | France | Nov. 10, 1958 |
| 747,070 | Great Britain | Mar. 28, 1956 |

UNITED STATES PATENT OFFICE
CERTIFICATE OF CORRECTION

Patent No. 3,088,300                                          May 7, 1963

James H. Elliott

It is hereby certified that error appears in the above numbered patent requiring correction and that the said Letters Patent should read as corrected below.

Column 4, line 10, for "sperated" read -- separated --; column 7, line 27, for "relatively" read -- relative --.

Signed and sealed this 20th day of October 1964.

(SEAL)
Attest:

ERNEST W. SWIDER                                  EDWARD J. BRENNER
Attesting Officer                                       Commissioner of Patents